US011068677B1

(12) United States Patent
Tan

(10) Patent No.: US 11,068,677 B1
(45) Date of Patent: Jul. 20, 2021

(54) CARD READER

(71) Applicant: Hin Leong Tan, Sunnyvale, CA (US)

(72) Inventor: Hin Leong Tan, Sunnyvale, CA (US)

( * ) Notice: Subject to any disclaimer, the term of this patent is extended or adjusted under 35 U.S.C. 154(b) by 0 days.

(21) Appl. No.: 17/003,908

(22) Filed: Aug. 26, 2020

(51) Int. Cl.
*G06K 7/10* (2006.01)
*G06K 9/20* (2006.01)
*G07F 7/08* (2006.01)

(52) U.S. Cl.
CPC ....... *G06K 7/10831* (2013.01); *G06K 9/2036* (2013.01); *G07F 7/0873* (2013.01); *Y10S 40/91* (2013.01)

(58) Field of Classification Search
CPC ............. G06K 7/10831; G06K 9/2036; G06K 7/10871; G07F 7/0873; Y10S 40/91
See application file for complete search history.

(56) References Cited

U.S. PATENT DOCUMENTS

| | | | | |
|---|---|---|---|---|
| 3,564,132 A * | 2/1971 | Baker | ...................... | G07C 9/27 348/156 |
| 3,767,291 A * | 10/1973 | Johnson | ............... | G02B 27/025 380/54 |
| 3,997,723 A * | 12/1976 | Sandin | ............. | G08B 13/19626 348/343 |
| 4,102,492 A * | 7/1978 | Gold | .................... | G05B 19/045 200/46 |
| 4,146,229 A * | 3/1979 | Morse | ....................... | A63F 1/10 273/150 |
| 4,381,890 A * | 5/1983 | Wallace | ............. | G03B 7/09971 396/276 |
| 4,391,505 A * | 7/1983 | Silverberg | ............... | B65H 7/14 271/259 |
| 4,516,845 A * | 5/1985 | Blakely | .................. | G03B 17/24 396/155 |
| 4,540,259 A * | 9/1985 | Blakely | .................. | G03B 17/24 396/332 |
| 4,886,957 A * | 12/1989 | Glaberson | ................ | G06K 7/14 235/482 |
| 4,982,072 A * | 1/1991 | Takigami | ................ | B60R 25/04 235/382 |
| 5,075,769 A * | 12/1991 | Allen | ....................... | H04N 9/64 358/500 |
| 5,444,230 A * | 8/1995 | Baldwin | .................. | G06K 7/14 235/454 |
| 5,550,359 A * | 8/1996 | Bennett | ............. | G06K 7/10861 235/380 |
| 5,642,160 A * | 6/1997 | Bennett | .................. | H04N 7/181 235/380 |
| 6,038,012 A * | 3/2000 | Bley | ....................... | G07C 9/253 355/40 |
| 7,382,911 B1 * | 6/2008 | Meier | ................ | G06K 7/10851 382/139 |
| 7,911,655 B2 * | 3/2011 | Hatzav | ................. | G03B 27/323 358/474 |

(Continued)

*Primary Examiner* — Daniel I Walsh
(74) *Attorney, Agent, or Firm* — Douglas L. Weller

(57) ABSTRACT

A card reader, includes card reader housing, a camera mounted on the card reader housing and a document input tray supported by the card reader housing. A light source is oriented to provide indirect light to the document when the document is within the document input tray. A direct light barrier shields the document from receiving direct light from the light source. A controller instructs the camera to capture an image of the document.

17 Claims, 10 Drawing Sheets

(56) References Cited

U.S. PATENT DOCUMENTS

| | | | | |
|---|---|---|---|---|
| 8,181,872 B2* | 5/2012 | Lebaschi | ............ | H04N 1/00326 235/440 |
| 8,243,349 B2* | 8/2012 | Hoshi | ................ | H04N 1/00795 358/475 |
| 8,777,109 B2* | 7/2014 | Oberpriller | ......... | G06K 7/1095 235/462.43 |
| 10,242,256 B2* | 3/2019 | Hagelin | .............. | H04L 63/0428 |
| 10,339,374 B1* | 7/2019 | Pribble | .............. | G06K 9/00456 |
| 2002/0005434 A1* | 1/2002 | Murakami | ............. | G06K 19/18 235/494 |
| 2002/0030321 A1* | 3/2002 | Sugiyama | ......... | H04N 1/00578 271/226 |
| 2002/0122209 A1* | 9/2002 | Yoshida | ............... | H04N 1/6033 358/2.1 |
| 2002/0138351 A1* | 9/2002 | Houvener | ............... | G06Q 20/04 705/18 |
| 2004/0196363 A1* | 10/2004 | Diamond | ............ | G06K 7/10732 348/64 |
| 2005/0002062 A1* | 1/2005 | Wakatabi | ........... | H04N 1/00557 358/1.18 |
| 2005/0051956 A1* | 3/2005 | Grauzer | .................... | A63F 1/14 273/149 R |
| 2005/0258244 A1* | 11/2005 | Mitchell | .................. | G06K 7/00 235/449 |
| 2006/0022039 A1* | 2/2006 | Beck | ...................... | G06K 13/06 235/440 |
| 2006/0038901 A1* | 2/2006 | Tapes | ..................... | H04N 9/735 348/254 |
| 2006/0064000 A1* | 3/2006 | Vizard | ................ | A61B 6/4417 600/407 |
| 2008/0063252 A1* | 3/2008 | Dobbs | ................. | G07D 7/005 382/137 |
| 2008/0180758 A1* | 7/2008 | Hall | .................. | H04N 1/00816 358/490 |
| 2008/0315516 A1* | 12/2008 | Willis | ....................... | A63F 1/10 273/148 R |
| 2009/0073503 A1* | 3/2009 | Lebaschi | ................ | H04N 1/203 358/450 |
| 2009/0086173 A1* | 4/2009 | Combs | ................ | G03B 21/134 353/122 |
| 2009/0086908 A1* | 4/2009 | Harder | ................ | A61B 5/0035 378/62 |
| 2009/0166955 A1* | 7/2009 | Romanoff | ............. | B65H 3/063 271/109 |
| 2010/0051695 A1* | 3/2010 | Yepez | ................ | G06K 7/10831 235/462.32 |
| 2012/0070185 A1* | 3/2012 | Yokota | ............... | G03G 21/1832 399/110 |
| 2013/0222559 A1* | 8/2013 | Lebaschi | ............ | H04N 1/00336 348/61 |
| 2014/0153066 A1* | 6/2014 | Booppanon | .......... | G03B 17/561 358/483 |
| 2014/0300939 A1* | 10/2014 | Suzuki | ............... | H04N 1/00602 358/498 |
| 2015/0222771 A1* | 8/2015 | Mori | .................. | H04N 1/00588 358/498 |
| 2016/0014351 A1* | 1/2016 | Blazevic | ................... | A63F 1/14 250/330 |
| 2016/0318653 A1* | 11/2016 | Pfeifer | ................. | B65D 5/5038 |
| 2017/0278361 A1* | 9/2017 | Fujimoto | ................. | G07G 1/12 |
| 2018/0018836 A1* | 1/2018 | Fankhauser | ............ | G08B 13/14 |
| 2019/0068823 A1* | 2/2019 | Ito | .......................... | H04N 1/121 |
| 2019/0304231 A1* | 10/2019 | Milos-Schouwink | ....................... | G07D 7/003 |
| 2019/0369382 A1* | 12/2019 | Chen | ..................... | G03B 21/28 |

* cited by examiner

CARD READER

BACKGROUND

Card readers are used to efficiently scan in data from cards such as business cards, driver's licenses, insurance identification cards and other forms of identification cards. The scanners can be simplex card scanners or duplex card scanners. Examples of current card scanners are the BCR901 Simplex Card Scanner and the DX1210 Duplex Card Scanner both currently available from Card Reader Inc, on the website www.bizcardreader.com

DETAILED DESCRIPTION OF SOME EMBODIMENTS

Figure 1:
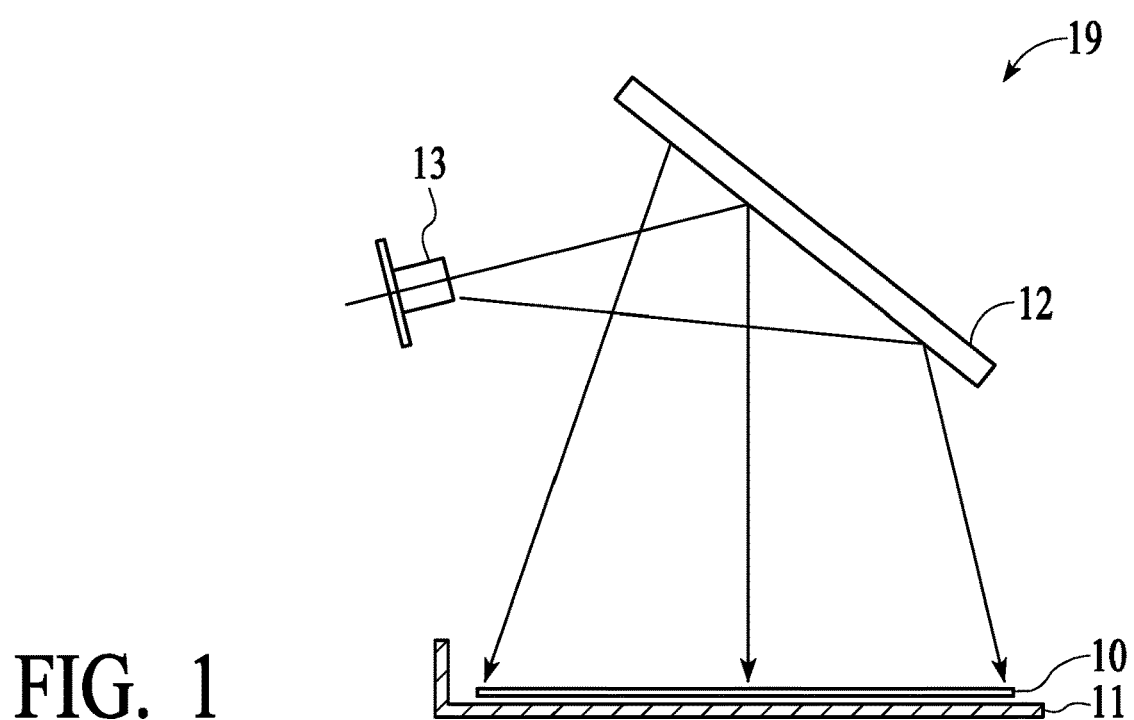
FIG. 1 is a simplified cross-sectional view of a card reader.

FIG. 1 is a simplified cross-sectional view of a card reader 19 that includes a camera 13, a mirror 12 and a document input tray 11. A document 10 is placed on document input tray 11 allowing camera 13 to capture an image of an upward facing surface of document 10. For example, document 10 is a card such as a business card, a driver's license, an insurance identification card or another form of identification card. Document 10, for example, may be laminated or otherwise coated to aid in preserving information displayed by document 10.

For example, mirror 12 is a front surface mirror (also known as a first surface mirror) where light reflects of the front surface of mirror glass, rather than reflecting off the back surface of the glass. For example, mirror 12 has silver coated on the front surface of mirror 12 to cause light to reflect from the front surface of the mirror glass.

Placement and orientation of camera 13 is chosen to capture light from document 10 as reflected by mirror 12.

Figure 2:
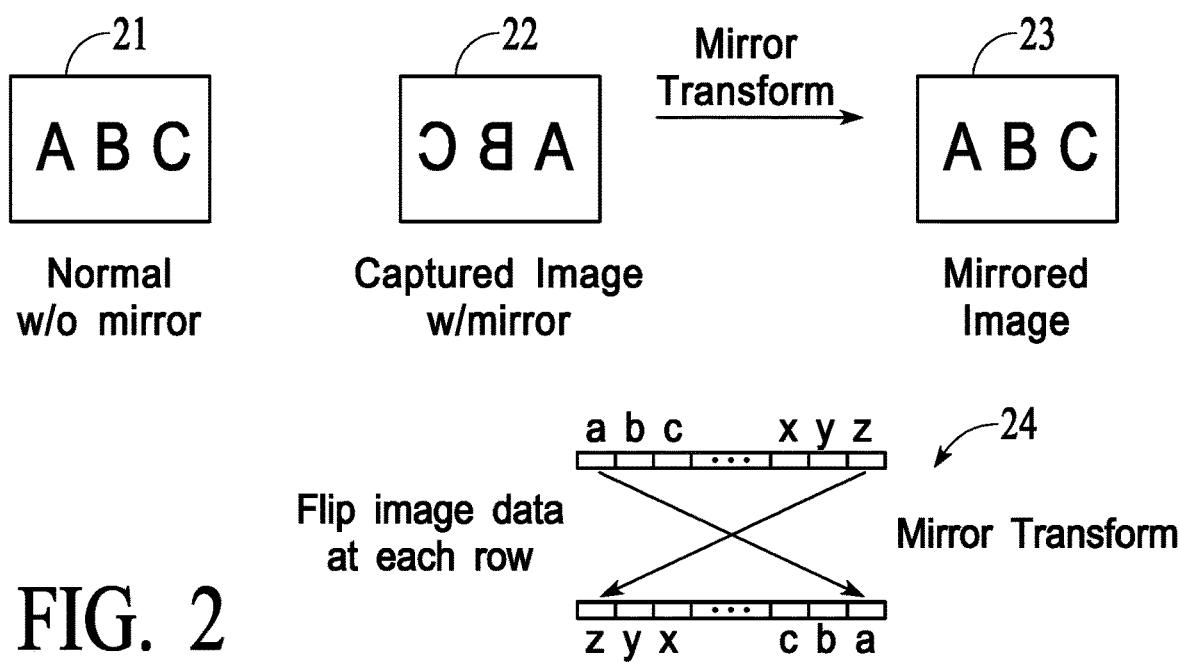
FIG. 2 illustrates the impact of capturing an image reflected from a mirror.

FIG. 2 illustrates the impact of capturing an image reflected from mirror 12. Simplified image 21 represents orientation of an image captured directly from a document. Simplified image 22 represents orientation of an image captured from a document after the image is reflected by mirror 12. Simplified image 23 represents orientation of an image captured from a document after the image is reflected by mirror 12 and then corrected by transformation software to restore the original orientation. Illustration 24 provides a visual illustration of the mirror transformation performed physically by mirror 12, and then inversely performed by transformation software.

Figure 3:
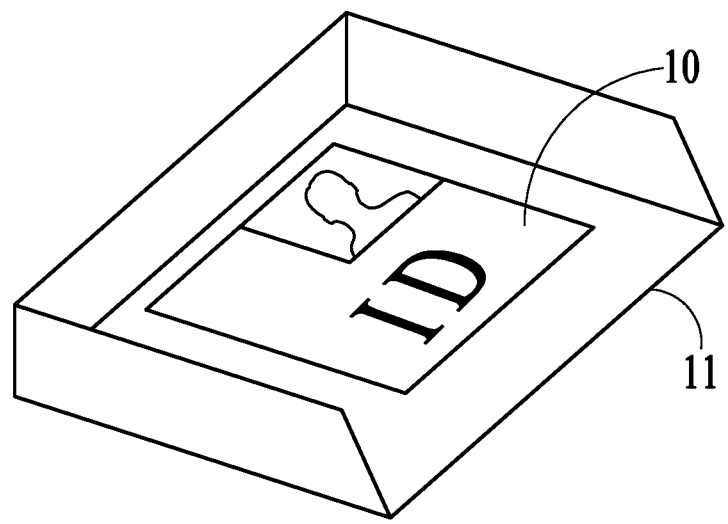
FIG. 3 shows a document input tray receiving a document.

FIG. 3 shows document input tray 11 receiving document 10. Document input tray 11 may be detachable from card reader 19, or may be fixed to the housing of card reader 19. For example, document input tray 11 is black in order to provide a contrasting background to document 10. The contrasting background makes it easier to detect the boundaries of document 10 and crop out the background. For very dark input cards (which are exceptions), a fixed sized image can be extracted that encompasses the image of the document.

Figure 4:
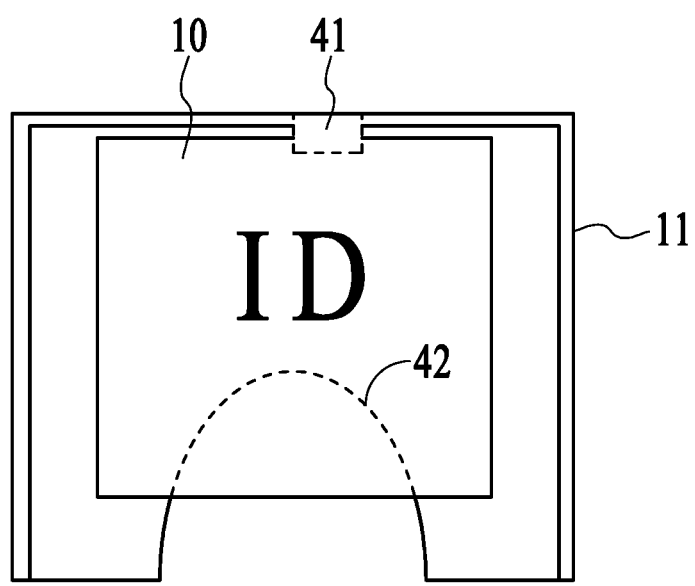
FIG. 4 shows a document input tray modified with a cut-out region.

FIG. 4 shows document input tray 11 modified with a cut out 42 that facilitates a user holding an edge of document 10 with a thumb and forefinger while placing document 10 in document input tray 11 and removing document 10 from document input tray 11.

Additionally, a cutout 41 is made in document input tray 11 to allow a sensor to detect the present of document 10 on document input tray 11. For example, the sensor is mounted on document input tray 10 or on the frame of card reader 19 so that a sensor beam impacts document 10 when document input tray 11 is placed in document input tray 11. The sensor and sensor can be located at the back of document input tray 11 as shown or can be at another location such as in the center document input tray 11, at the front of document input tray 11 or on either side of document input tray 11.

Figure 5:
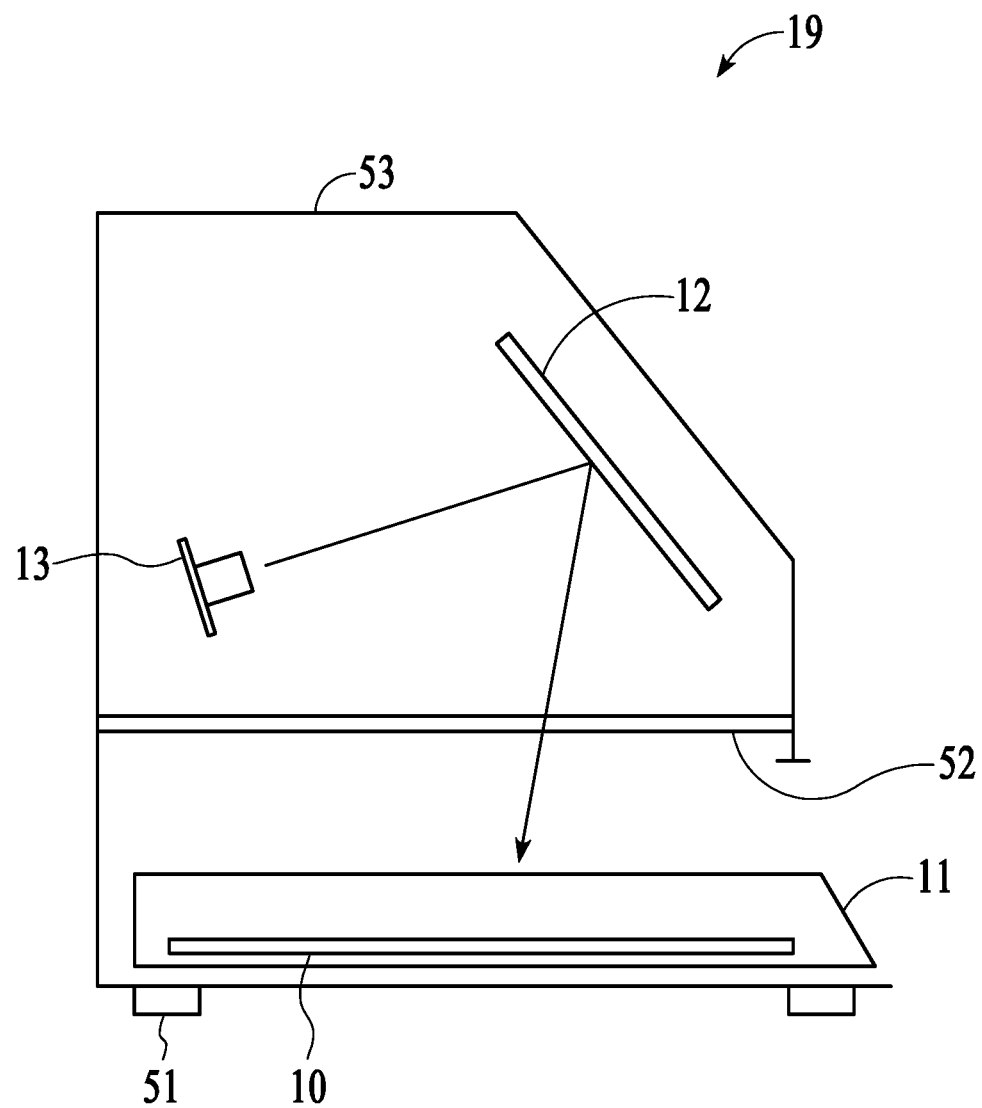
FIG. 5 is a simplified cross-sectional side view of the card reader shown in FIG. 1.

FIG. 5 is a simplified cross-sectional side view of card reader 19 that shows camera 13, mirror 12 and document input tray 11. Also shown is card reader housing 53, a document sensor 51 and a glass barrier 52 placed between mirror 12 and document input tray 11. Glass barrier 52 is used to isolate camera 13 and mirror 12 from external elements such as dirt and dust that may otherwise contaminate the lens of camera 13 and mirror surface 12. For example, glass barrier 52, is composed of glass that has an anti-reflective coating on one or both sides to reduce the amount of surface reflection that can produce glare on a captured image.

Figure 6:
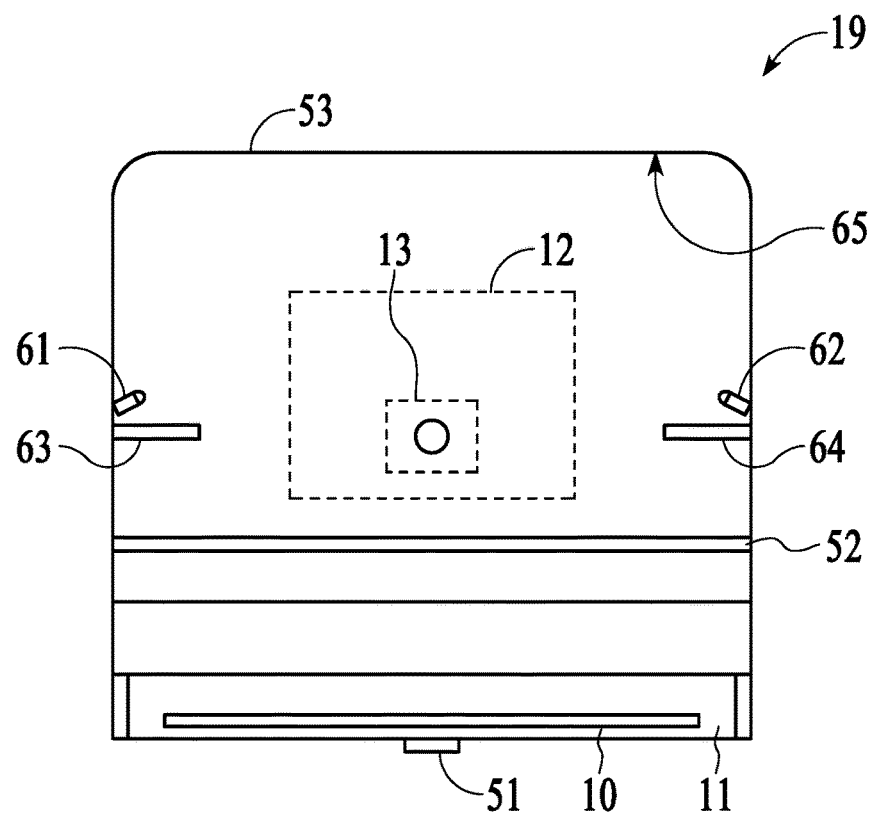
FIG. 6 is a simplified cross-sectional front view of the card reader shown in FIG. 1.

FIG. 6 is a simplified cross-sectional front view of card reader 19 that shows camera 13, mirror 12, document input tray 11, card reader housing 53, document sensor 51 and glass barrier 52. FIG. 5 also shows a light emitting diode (LED) light source 61 and an LED light source 62 added to provide indirect lighting for document 10. A light shield 63 is located below LED light source 61 and a light shield 64 is located below LED light source 62 to prevent direct lighting of document 10 that could cause reflective glare spots in a captured image. For example, an interior surface 65 of card reader housing 53 is coated with non-gloss matte white material or paint to better allow diffused illumination of document 10 primarily by reflection of light from LED light source 61 and LED light source 62. Diffused lighting from LED light sources reflected off an interior matte surface of housing, light shields, anti-reflective glass coating on the glass barrier and a lens hood on the camera can all be used to reduce glare on a captured image of document 10.

Figure 7:
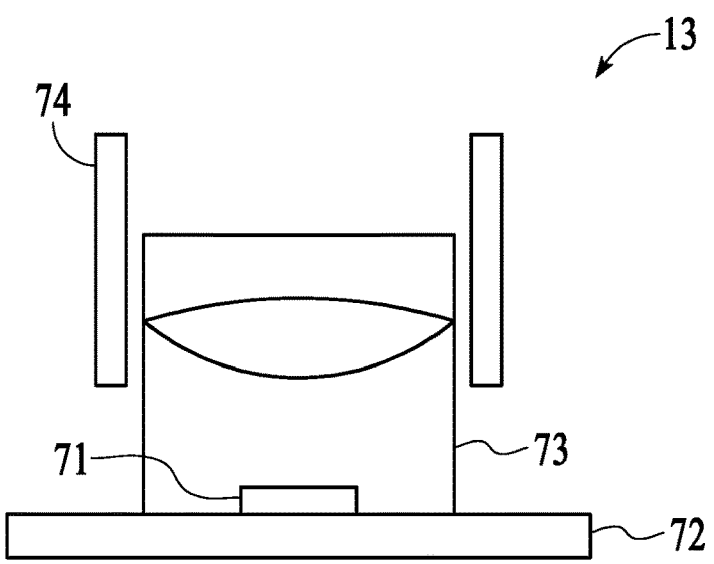
FIG. 7 shows implementation of a camera used by the card reader shown in FIG. 1.

FIG. 7 shows an example implementation of camera 13. Camera 13 is composed of, for example, an image sensor 71 mounted on a printed circuit board (PCB) 72 under a lens 73. A lens hood 74 may be placed around lens 73 to reduce glare of a captured image. For example, camera 13 is micro camera similar to those used in a smart phone. Such cameras are very small yet with sufficient resolution for high resolution image. For example, lens 73 is a high precision wide angle low-distortion lens mounted on PCB 72. For example PCB 72 includes a USB interface to a computing device which receives the image. Alternatively or in addition, PCB 72 includes a wireless interface such as an interface implemented using Bluetooth wireless technology to transfer images captured by camera 13 to a computing device.

Alternatively, or in addition, a captured image can be stored in a memory, such as a flash card memory, integrated as part of card reader 19.

Figure 8:
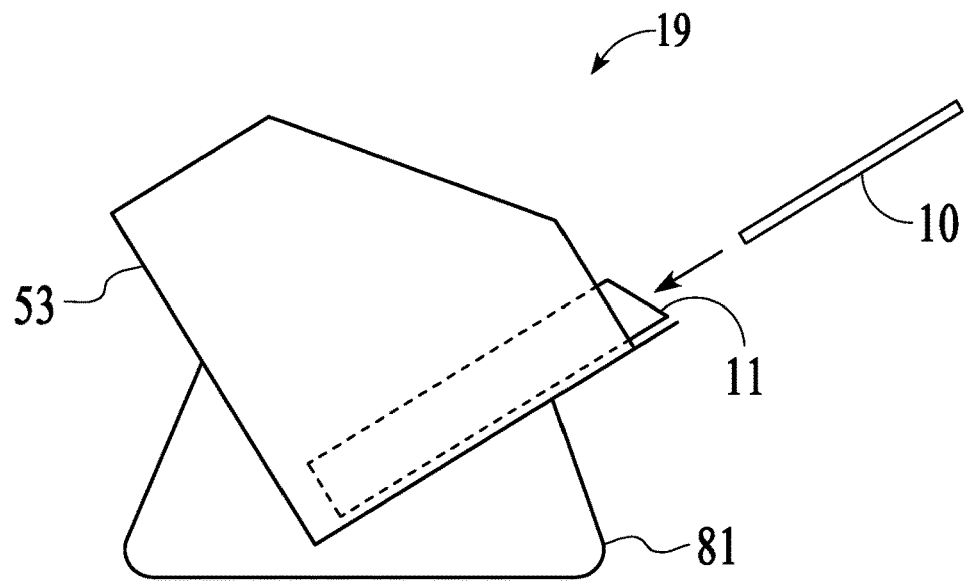
FIG. 8 shows the card reader shown in FIG. 1 mounted on a support.

FIG. 8 shows card reader 19 mounted on a support 81 that holds card reader housing 53 and document input tray 11 at an angle that simplifies placement of document 10 into document input tray 11 and removal of document 10 from document input tray 11. For example, document input tray 11 is inclined at about 45 degrees to horizontal.

The implementation of card reader shown in FIG. 8 is compact. Insertion of document 10 into document input tray 11 is gravity aided as document input tray 11 is held by card reader housing 53 at an inclined angle sufficiently steep so that when document 10 is placed into a front of document input tray 11, document 10 will tend to slide to a back of document input tray 11 and rest against a back wall of the document input tray 11. Document 10 sliding down into position within document input tray 11 provides for automatic alignment of document 10 to flat edge of document input tray 11 minimizing document skew when scanning. Cut out 42, shown in FIG. 4, makes for easy extraction of document 10 from document input tray 11. There is no need for moving parts such as a motor to drive an automated feed or any motion mechanism to perform image capture, that can wear out over time.

Figure 9:
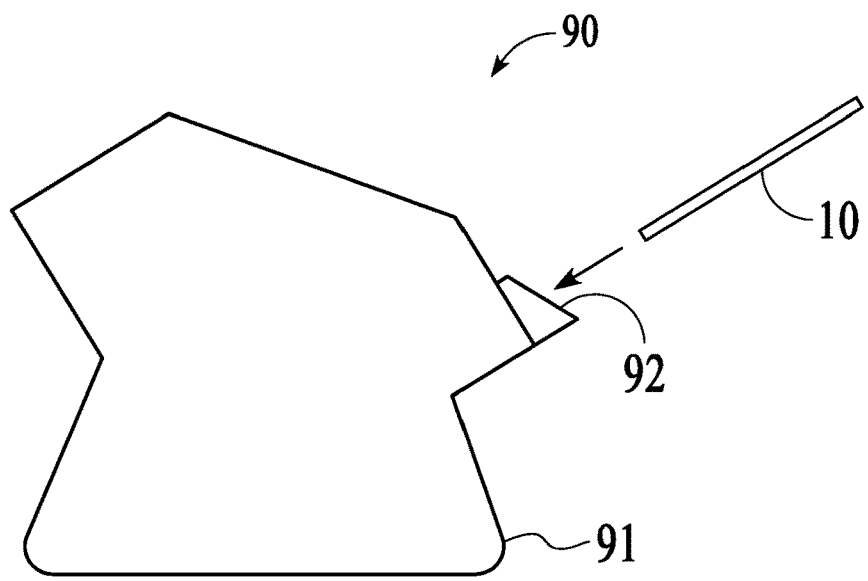
FIG. 9 shows a simplified side view of a card reader that holds a document input tray at an angle that simplifies placement and removal of a document.

While FIG. 8 shows a separate support 81, the support can be integrated into the card reader housing. For example, FIG. 9 shows a simplified side view of a card reader 90 where card reader housing 91 holds a document input tray 92 at an angle that simplifies placement of document 10 into document input tray 92 and removal of document 10 from document input tray 92. For example, document input tray 92 is inclined at about 45 degrees to horizontal.

Figure 10:
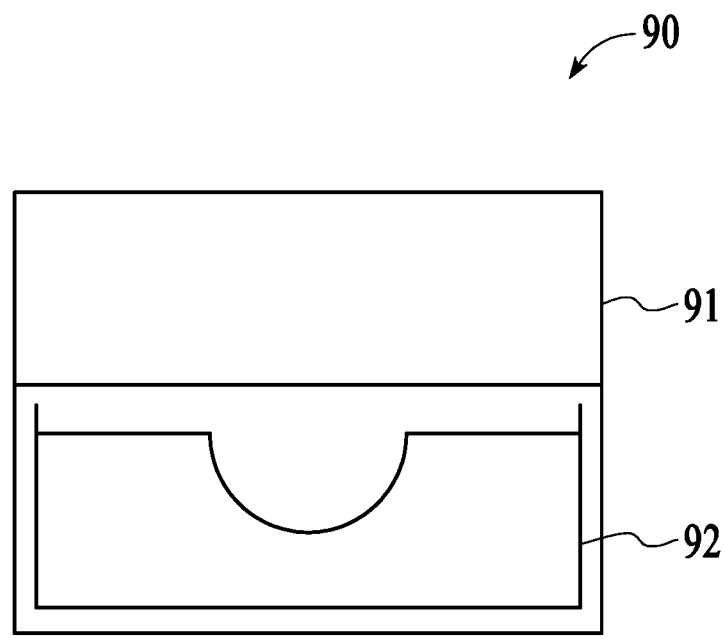
FIG. 10 shows a simplified front view of the card reader shown in FIG. 9.

FIG. 10 shows a simplified front view of a card reader 90 with card reader housing 91 and document input tray 92.

Figure 11:
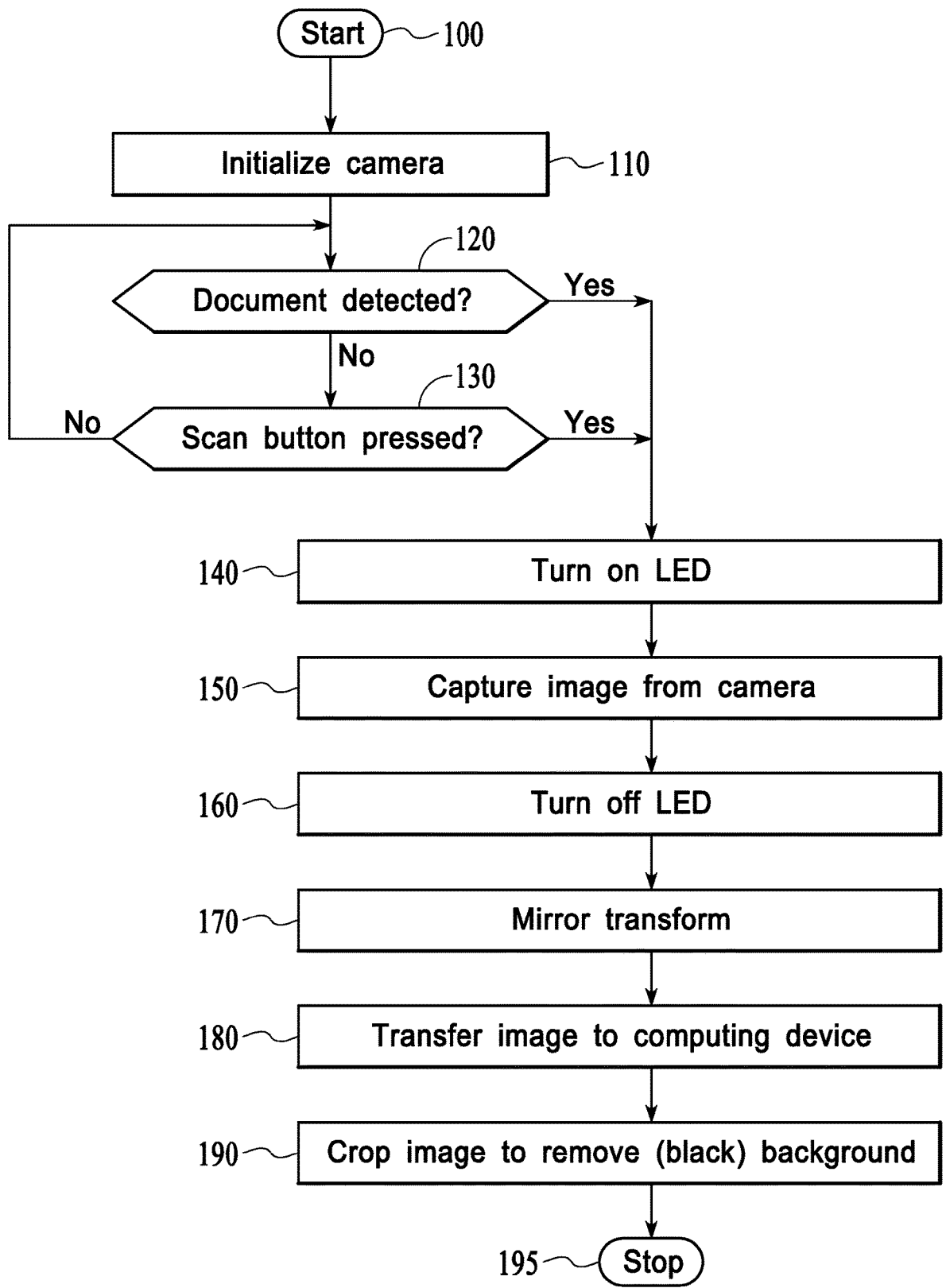
FIG. 11 is a simplified flow chart describing a process of capturing a single document image.

FIG. 11 is a simplified flow chart describing a process performed by a controller that captures a single document image. For example, the controller is implemented completely by components and firmware on PCB 72. Alternatively, the controller is implemented in a distributive manner with part of the functionality performed by components and firmware on PCB 72 and part of the functionality (e.g., the cropping) performed by a separate computing device as pointed out below.

In a block 100, the process starts. In a block 110 camera settings are initialized. For example, the camera settings include brightness, contrast, exposure, and so on.

In a block 120 and a block 130, the process waits for a processing input that triggers an image capture process. In block 120, the processing input that triggers the image capture process is a document detected by document sensor 51. For example, if document 10 is on document input tray 11, the document sensor status of document sensor 51 is "ON" which indicates that a document is detected. Conversely if no document is on document input tray 11, the document sensor status of document sensor 51 is "OFF" which indicates that there is no document on document input tray 11.

In block 130, the processing input that triggers the image capture process is a scan button pressed by a user. For example the scan button (not shown) activates an image capture whenever the scan button is pressed. The scan button serves as an override to the document sensor. If for some reason document sensor 51 does not detect document 10 on document input tray 11, the scan button can be used to immediately activate the image capture process. Some document sensors may not respond to specific card material, so a scan button override can be useful.

From block 120 or block 130, when a processing input that triggers an image capture process is detected, in a block 140, LED light source 61 and LED light source 62 are turned on. In a block 150, camera 13 captures an image of document 10. In a block 160, LED light source 61 and LED light source 62 are turned off. In a block 170, a mirror transform is performed. For example, the mirror transform can be performed by camera 13 when camera 13 captures the image of document 10. In this case, the mirror transform is integrated into block 150. Alternatively, the mirror transform can be performed separately as a processing stage immediately after the image capture as shown in block 170. Alternatively, the mirror transform can be performed separately by a computing device after the image is transferred to the computing device in a block 180.

In block, 180 the captured image is transferred to the computing device. In a block 190, the captured image is cropped to remove the black background. In a block 195, the process is complete. While in the sequence shown in FIG. 11, the captured image is cropped by the computing device that receives the captured image, in an alternative embodiment, the cropping can be performed by a controller implemented on PCB 72 before being transferred to the computing device.

Figure 12:
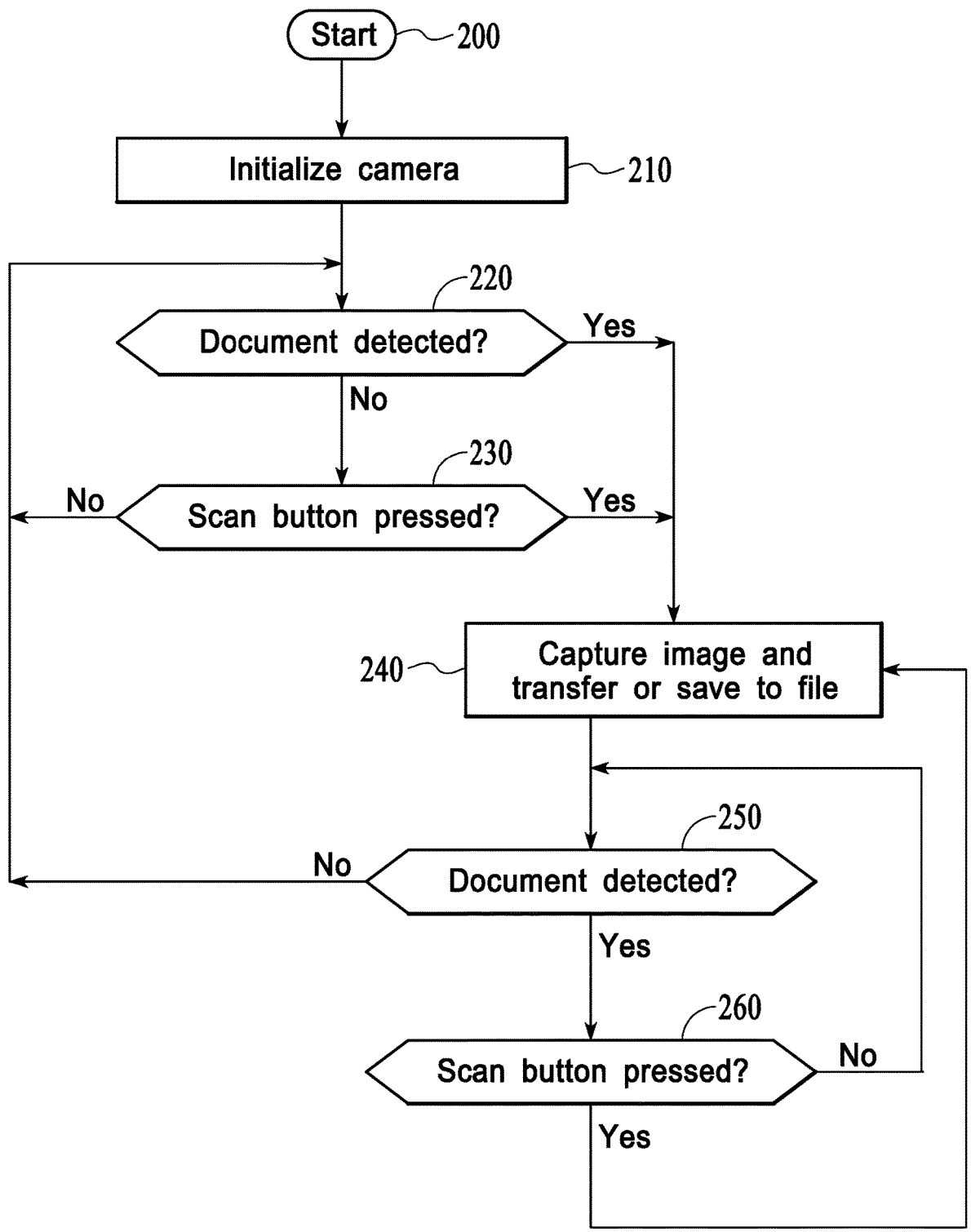
FIG. 12 is a simplified flow chart describing a process of automatically capturing document images.

FIG. 12 is a simplified flow chart describing a process of automatically capturing document images. In a block 200, the process starts. In a block 210 camera settings are initialized. For example, the camera settings include brightness, contrast, exposure, and so on.

In a block 220 and a block 230, the process waits for a processing input that triggers an image capture process. In block 220, the processing input that triggers the image capture process is a document detected by document sensor 51. For example, if document 10 is on document input tray 11, the document sensor status of document sensor 51 is "ON" which indicates that a document is detected. Conversely if no document is on document input tray 11, the document sensor status of document sensor 51 is "OFF" which indicates that there is no document on document input tray 11.

In block 230, the processing input that triggers the image capture process is a scan button pressed by a user. For example the scan button (not shown) activates an image capture whenever the scan button is pressed. The scan button serves as an override to the document sensor. If for some reason document sensor 51 does not detect document 10 on document input tray 11, the scan button can be used to immediately activate the image capture process. Some document sensors may not respond to specific card material, so a scan button override can be useful.

From block 220 or block 230, when a processing input that triggers an image capture process is detected, in a block 240, LED light source 61 and LED light source 62 are turned on, camera 13 captures an image of the document 10, LED light source 61 and LED light source 62 are turned off, the mirror transform is performed, the captured image is transferred to the computing device and, the captured image is cropped to remove the black background.

In a block 250 and a block 260, the process waits for either the removal of the document that has been scanned at block 240, or for the trigger from the scan button. In block 250, if a document is detected, it indicates that the previous document which has been captured at block 240 has not been removed. Processing continues at block 260 which checks if the scan button has been pressed. If the scan button is not pressed, processing repeats at block 250 until the document is removed. When the document is removed, processing jumps to block 220, and waits for the insertion of the next document to initiate the scanning of the next image. In block 260, if the button is pressed, it will continue at block 240 which will immediately activate the image capture process. Block 260 effectively causes the same document to be captured again even if captured document is not removed.

Figure 13:
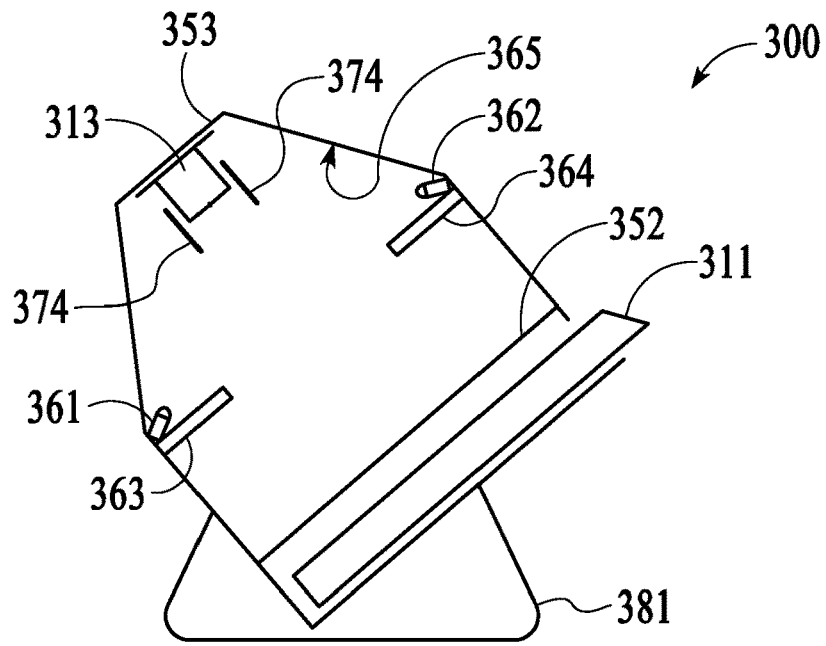
FIG. 13 shows an alternative implementation of a card reader.

FIG. 13 shows a card reader 300 that includes a camera 313, a document input tray 311 and card reader housing 353. A glass barrier 352 is used to isolate camera 313 from external elements such as dirt and dust that may otherwise contaminate the lens of camera 313. For example, glass barrier 352, is composed of glass that has anti-reflective coated on one or both sides to reduce the amount of surface reflection that can produce glare on a captured image.

An LED light source 361 and an LED light source 362 are added to provide indirect lighting for illuminating a document placed on document input tray 311. A light shield 363 is located below LED light source 361 and a light shield 364 is located below LED light source 362 to prevent direct lighting of the document that could cause reflective glare spots in a captured image. For example, an interior surface 365 of card reader housing 353 is coated with non-gloss matte white material or paint to better allow diffused illumination of the document primarily by reflection of light from LED light source 361 and LED light source 362. A lens hood 374 is placed camera 313 to reduce glare of a captured image.

Card reader 300 is mounted on a support 381 that holds card reader housing 353 and document input tray 311 at an angle that simplifies placement of a document into document input tray 311 and removal of the document from document input tray 311.

Figure 14:
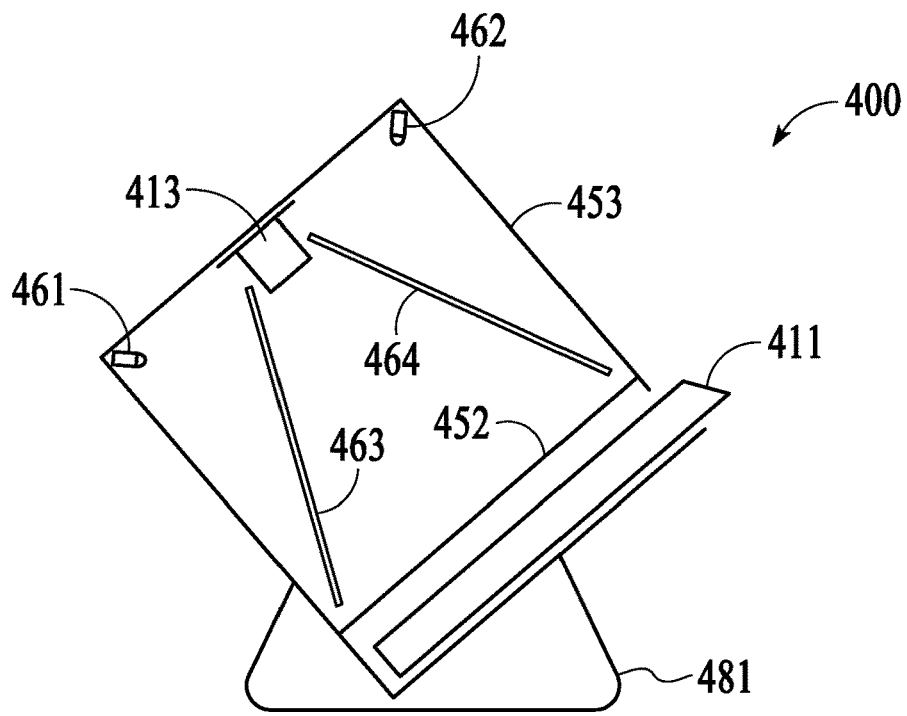
FIG. 14 shows another alternative implementation of a card reader.

FIG. 14 shows a card reader 400 that includes a camera 413, a document input tray 411 and card reader housing 453. A glass barrier 452 is used to isolate camera 413 from external elements such as dirt and dust that may otherwise contaminate the lens of camera 413. For example, glass barrier 452 is composed of glass that has anti-reflective coated on one or both sides to reduce the amount of surface reflection that can produce glare on a captured image.

An LED light source 461 and an LED light source 462 are added to provide indirect lighting for illuminating a document placed on document input tray 411. A light diffuser 463 is located below LED light source 461 and a light diffuser 464 is located below LED light source 462 to diffuse light from LED light source 461 and LED light source 462. Diffuser 463 and diffuser 464 mitigate reflective bright spots on a captured image due to the reflection of LED light off the document surface. Such reflective bright spots can be especially pronounced if the document is composed of reflective material such as a plastic card with a glossy surface.

Card reader 400 is mounted on a support 481 that holds card reader housing 453 and document input tray 411 at an angle that simplifies placement of a document into document input tray 411 and removal of the document from document input tray 411.

Figure 15:
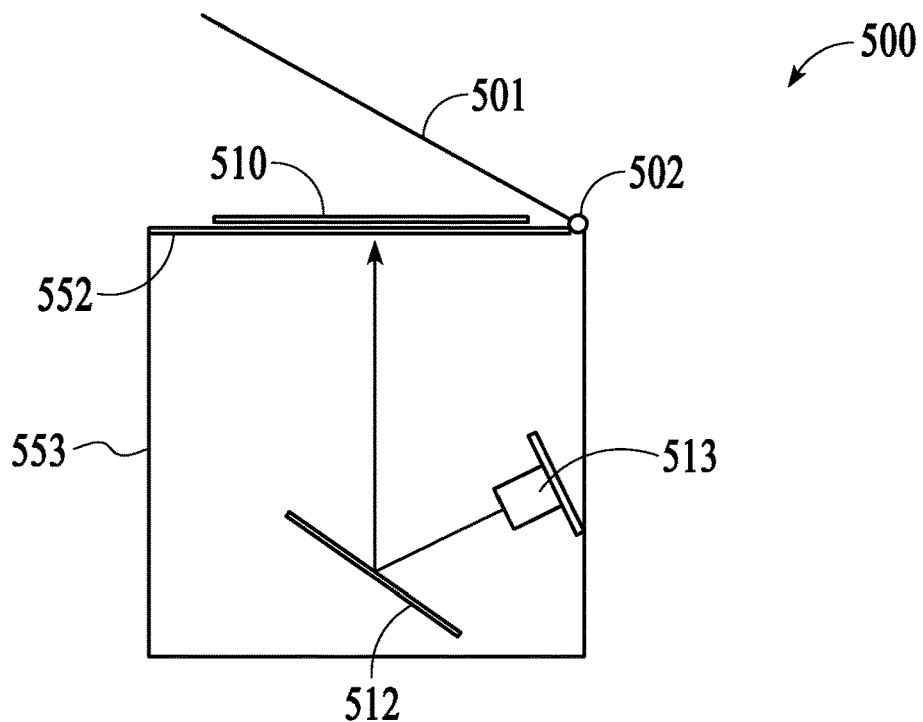
FIG. 15.
Figure 16:
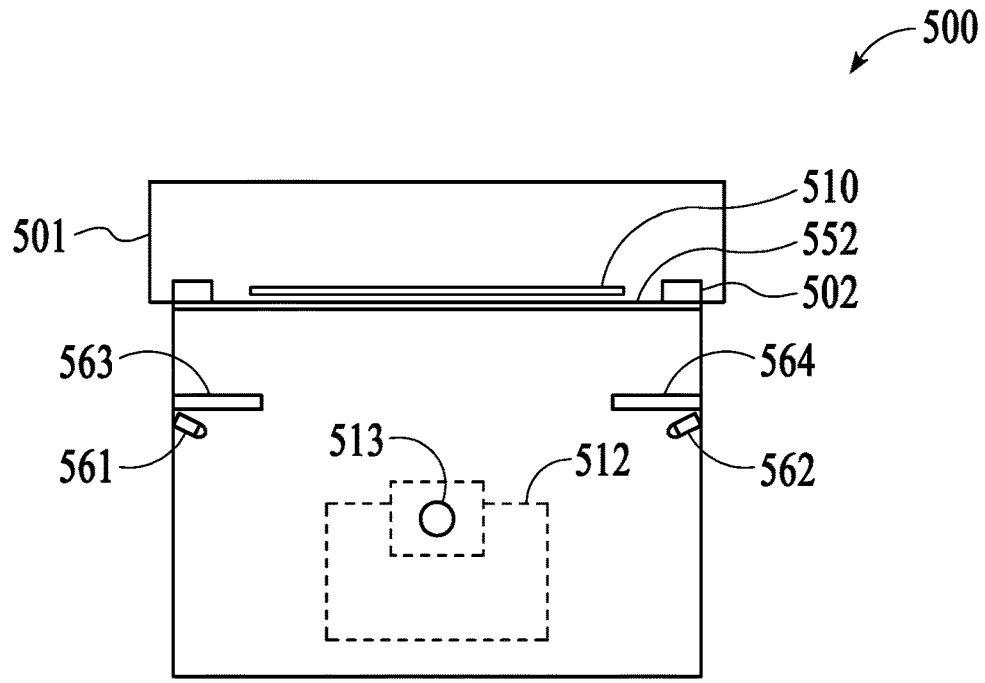
FIG. 16 shows another alternative implementation of a card reader.

FIG. 15 shows a simplified side view and FIG. 16 shows a simplified front view of a card reader 500 that includes a camera 513, a mirror 512 and card reader housing 553. A glass top 552 is used to isolate camera 513 and mirror 512 from external elements such as dirt and dust. For example, glass top 552, is composed of glass that has anti-reflective coated on one or both sides to reduce the amount of surface reflection that can produce glare on a captured image.

An LED light source 561 and an LED light source 562 are added to provide indirect lighting for illuminating a document placed on glass top 552. A light shield 563 is located below LED light source 561 and a light shield 564 is located below LED light source 562 to prevent direct lighting of the document that could cause reflective glare spots in a captured image. For example, an interior surface of card reader housing 553 can be coated with non-gloss matte white material or paint to better allow diffused illumination of the document primarily by reflection of light from LED light source 561 and LED light source 562. A lens hood is placed on camera 513 to reduce glare of a captured image. A hinge 502 is used to swing and hold a document lid 501 in place.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The invention claimed is:

1. A card reader, comprising:
    card reader housing, the card reader housing having an interior matte surface;
    a camera mounted on the card reader housing;
    a card input tray supported by the card reader housing, the card input tray providing automated alignment of a card by being at an inclined angle sufficiently steep so that when the card is placed into a front of the card input tray, the card will tend to slide to a back of the card input tray and rest against a back wall of the card input tray, the back wall aligning the card to minimize document skew when scanning; and
    a light source oriented to direct light away from the card and toward the interior matte surface of the card reader housing so that illumination of the interior matte surface provides indirect light that illuminates the card when the card is within the card input tray;
    wherein a support structure is integrated into the card reading housing so that the card input tray is at the inclined angle.

2. A card reader as in claim 1, wherein the light source comprises a plurality of light emitting diodes.

3. A card reader as in claim 1, additionally comprises a mirror oriented to reflect light from the card to the camera.

4. A card reader as in claim 1, wherein a bottom of the card input tray includes a cut-out region that goes all the way through the bottom of the card input tray so that the cut-out region exposes a portion of a bottom surface of the card and allows the portion of the bottom surface of the card and a corresponding top surface portion of the card to be grasped by a thumb and forefinger of a user for removal of the card from the input tray.

5. A card reader, comprising:
card reader housing, the card reader housing having an interior matte surface;
a camera mounted on the card reader housing;
a card input tray supported by the card reader housing, the card input tray providing automated alignment of a card by being at an inclined angle sufficiently steep so that when the card is placed into a front of the card input tray, the card will tend to slide to a back of the card input tray and rest against a back wall of the card input tray, the back wall aligning the card to minimize document skew when scanning; and
a light source oriented to direct light away from the card and toward the interior matte surface of the card reader housing so that illumination of the interior matte surface provides indirect light that illuminates the card when the card is within the card input tray;
wherein a separate support structure supports the card reading housing so that the card input tray is at the inclined angle.

6. A card reader as in claim 1, wherein the direct light barrier includes a light hood placed around the camera.

7. A card reader as in claim 1, wherein the card reader further comprises a controller that performs a mirror transform of the captured image.

8. A card reader as in claim 1, wherein the card reader further comprises a controller that crops the captured image to remove or filter from the captured image background captured along with the card.

9. A card reader, comprising:
card reader housing, the card reader housing having an interior matte surface;
a camera mounted on the card reader housing;
a card input tray supported by the card reader housing, a bottom of the card input tray including a cut-out region that goes all the way through the bottom of the card input tray so that the cut-out region exposes a portion of a bottom surface of a card and allows the portion of the bottom surface of the card and a corresponding top surface portion of the card to be grasped by a thumb and forefinger of the user for removal of the card from the input tray; and
a light source oriented to direct light away from the card and toward the interior matte surface of the card reader housing so that illumination of the interior matte surface provides indirect light to the card when the card is within the card input tray;
wherein a support structure is integrated into the card reading housing so that the card input tray is at an inclined angle sufficiently steep so that a card placed into a front of the card input tray will tend to slide to a back of the card input tray and rest against a back wall of the card input tray.

10. A card reader as in claim 9, additionally comprises a mirror oriented to reflect light from the card to the camera.

11. A card reader, comprising:
card reader housing, the card reader housing having an interior matte surface;
a camera mounted on the card reader housing;
a card input tray supported by the card reader housing, a bottom of the card input tray including a cut-out region that goes all the way through the bottom of the card input tray so that the cut-out region exposes a portion of a bottom surface of a card and allows the portion of the bottom surface of the card and a corresponding top surface portion of the card to be grasped by a thumb and forefinger of the user for removal of the card from the input tray; and
a light source oriented to direct light away from the card and toward the interior matte surface of the card reader housing so that illumination of the interior matte surface provides indirect light to the card when the card is within the card input tray;
wherein a separate support structure supports the card reading housing at an inclined angle sufficiently steep so that a card placed into a front of the card input tray will tend to slide to a back of the card input tray and rest against a back wall of the card input tray, the back wall aligning the card to minimize document skew when scanning.

12. A card reader as in claim 9, wherein a sensor detects when the card is on the card input tray.

13. A card reader as in claim 9, wherein the card reader further comprises a controller that crops the captured image to remove or filter from the captured image background captured along with the card.

14. A card reader, comprising:
card reader housing;
a camera mounted on the card reader housing;
a card input tray supported by the card reader housing, a bottom of a card input tray including a cut-out region that goes all the way through the bottom of the card input tray so that the cut-out region exposes a portion of a bottom surface of the card and allows the portion of the bottom surface of the card and a corresponding top surface portion of the card to be grasped by a thumb and forefinger of the user for removal of the card from the input tray, wherein the card input tray provides automated alignment of the card by being at an inclined angle sufficiently steep so that when the card is placed into a front of the card input tray, the card will tend to slide to a back of the card input tray and rest against a back wall of the card input tray, the back wall aligning the card to minimize document skew when scanning;
a light source oriented to provide light to the card when the card is within the card input tray; and
a diffuser that diffuses light from the light source before the light reaches the card;
wherein a support structure is integrated into the card reading housing so that the card input tray is at the inclined angle.

15. A card reader as in claim 14, wherein the light source comprises a plurality of light emitting diodes.

16. A card reader as in claim 14, additionally comprises a mirror oriented to reflect light from the card to the camera.

17. A card reader, comprising:
card reader housing;
a camera mounted on the card reader housing;
a card input tray supported by the card reader housing, a bottom of a card input tray including a cut-out region that goes all the way through the bottom of the card input tray so that the cut-out region exposes a portion of a bottom surface of the card and allows the portion of the bottom surface of the card and a corresponding top surface portion of the card to be grasped by a thumb and forefinger of the user for removal of the card from the input tray, wherein the card input tray provides automated alignment of the card by being at an inclined angle sufficiently steep so that when the card is placed into a front of the card input tray, the card will tend to slide to a back of the card input tray and rest against a back wall of the card input tray, the back wall aligning the card to minimize document skew when scanning;

a light source oriented to provide light to the card when the card is within the card input tray; and a diffuser that diffuses light from the light source before the light reaches the card;

wherein a separate support structure supports the card reading housing so that the card input tray is at the inclined angle.

* * * * *